United States Patent
Wu

(10) Patent No.: US 6,703,159 B2
(45) Date of Patent: Mar. 9, 2004

(54) ELECTRONIC DEVICE BATTERY HOLDER STRUCTURE

(75) Inventor: Tsung-Yao Wu, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 0 days.

(21) Appl. No.: 10/201,942

(22) Filed: Jul. 25, 2002

(65) Prior Publication Data

US 2004/0017179 A1 Jan. 29, 2004

(51) Int. Cl.[7] ............................................. H01R 3/00
(52) U.S. Cl. ..................................................... 429/99
(58) Field of Search ........................... 439/500; 429/99, 429/96, 100

(56) References Cited

U.S. PATENT DOCUMENTS 4,161,568 A * 7/1979 Lund .......................... 429/99
5,038,093 A * 8/1991 Edwards ..................... 429/99
6,579,119 B1 * 6/2003 Wu ............................ 439/500

* cited by examiner

Primary Examiner—Neil Abrams
(74) Attorney, Agent, or Firm—Bacon & Thomas, PLLC

(57) ABSTRACT

The invention is to provide an electronic device battery holder structure comprised of a case of one-piece construction, the said case having an opening formed in its exterior lateral surface as well as another opening formed in its interior lateral surface; a compartment disposed in the said case such that one portion of the said compartment is aligned with and contiguous to the position of the said opening and its other portion is aligned with and contiguous to the position of the said other opening, the said compartment having internally situated a minimum of one or more battery holders that enable the sequential installation of a plurality of batteries from the said opening into the said battery holders.

11 Claims, 4 Drawing Sheets

ELECTRONIC DEVICE BATTERY HOLDER STRUCTURE

BACKGROUND OF THE INVENTION

1) Field of the Invention

The invention herein relates to an electronic device battery holder, especially to an electronic device battery holder of the structure in one-piece manufactured by plastic injection molding.

2) Description of the Prior Art

In an age of global information technology and the prolific development of electronics industry, various high technology computer-related products and electronic equipment have been rapidly developed to provide people greater living conveniences. Moreover, as a diverse range of electronic equipment is continually released, the demand for consumer electronic products is getting higher and higher. Therefore, whether the future consumer electronic products able to provide greater convenience and service has become a means of evaluating the sales of the electronic products and determining if the manufacturers thereof are leading beyond others. As a result, in response to the immense market demand for electronic products, high technology companies are not only maintaining product quality, but at the same time also ramping up production rates. In other words, each production line segment affects the acceleration of finishing speed, especially battery holder fabrication, which has become an important factor in increasing electronic product assembly speed. Since competition between electronics manufacturers is fierce, if production line finishing speed is not sufficient to gain a leading market position, such companies will be eliminated by harsh competition.

To facilitate the assembly of a positive contact (for example, a flat spiral spring) and a negative contact (for example, a helical spring), the battery holder of conventional electronic equipment is not of one-piece by using plastic injection molded construction, but formed as a compartment recessed on a lower case, with the upper section of the said compartment remaining hollow. As a result, the battery holder on an upper case must have a recess formed at an appropriate position matching with the said compartment such that when the said upper case and the said lower case are conjoined, the said recess becomes the upper section of the said compartment and, thereby, forming a completed battery holder within the electronic equipment.

However, since the said upper case and lower case are formed by injection utilizing two sets of molds, their fabrication and assembly processes consume much time as well as labor and, furthermore, occasional dimension discrepancies between the said compartment and the said recess results in conjoinment impossibility and defective products, overall production cost is significantly increased and can actually be attributed to serious design shortcomings. As the said battery holder is assembled from the said upper and lower case and, furthermore, the position of the said compartment and the said recess must be in exact alignment and consistency, this imposes considerable restrictions on the dimensions of the circuit board housed inside the said electronic equipment. If the dimensions of the said circuit board cannot be altered or substituted, the manufacturer must enlarge the physical size of the said upper and lower case, which is also another design shortcoming that runs counter to the manufacturing concept of reducing cost to achieve high efficiency and exceptional results.

SUMMARY OF THE INVENTION

In view of the fact that the conventional battery holder is not of one-piece, plastic injection molded construction, but consists of an upper case and a lower case that are separately injection molded and thus have to be assembled before the said battery holder is constituted, therefore, its fabrication and assembly processes consumes much time and labor and, furthermore, two molds are required and after the injected fabrication of the compartment and recess, occasional conjoinment impossibility also increases overall production cost, the invention herein addresses these and other shortcomings with an electronic device battery holder structure that was successfully developed based on extensive research and experimentation.

The said structure is comprised of a case of one-piece construction, the said case having an opening formed in its exterior lateral surface as well as another opening formed in its interior lateral surface; a compartment disposed in the said case such that one portion of the said compartment is aligned with and contiguous to the position of the said opening and its other portion is aligned with and contiguous to the position of the said other opening, the said compartment having internally situated a minimum of one or more battery holders that enable the sequential installation of a plurality of batteries from the said opening into the said battery holders, wherein a first insertion contact seat is situated at one end of the said battery holders proximal to the position of the said opening and a second insertion contact seat is situated at the position of the other opening proximal to the opposite end, with a slot formed in the top of the said second insertion contact seat; a minimum of one or more first electrical contacts that are fitted into the said first insertion contact seat; and a minimum of one or more second electrical contacts that are fitted into the said second insertion seat through the said slot.

The above and other objects, features and advantages of the present invention will become apparent from the following detailed description taken with the accompanying drawings.

DETAILED DESCRIPTION OF THE INVENTION

Figure 1:
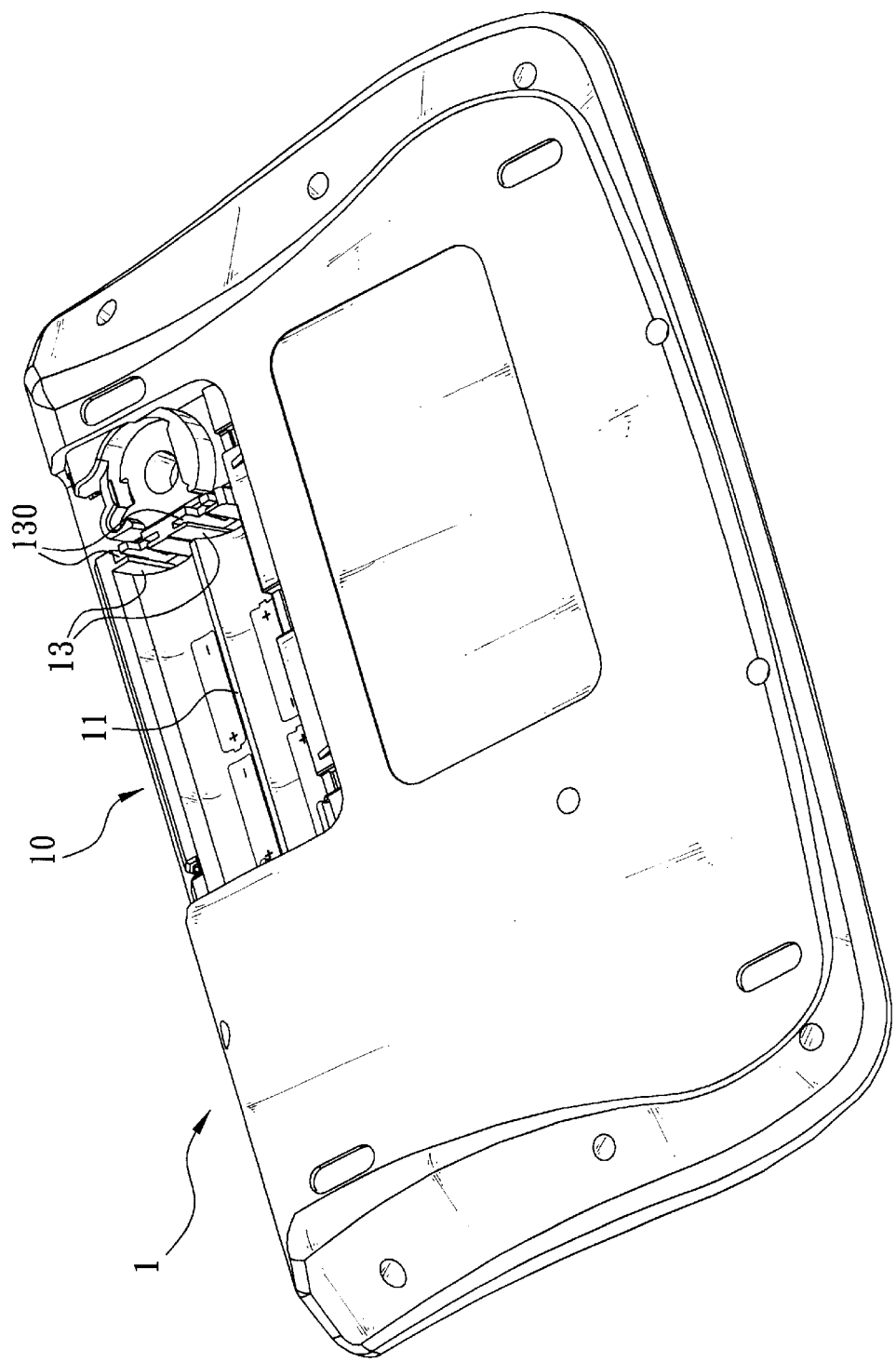
FIG. 1 is a perspective drawing of the structure of the invention herein (1).

The invention herein is an electronic device battery holder structure; referring to FIG. 1, FIG. 2, FIG. 3 and FIG. 4 the said structure is comprised of a case 1 of one-piece construction, the case 1 having an opening 10 formed in its exterior lateral surface as well as another opening 16 formed in its interior lateral surface; a compartment 11 disposed in the said case 1 such that one portion of the said compartment 11 is aligned with and contiguous to the position of the said opening 10 and its other portion is aligned with and contiguous to the position of the said other opening 16, the said compartment 11 having internally situated a minimum of one or more battery holders 12 that enable the sequential installation of a plurality of batteries from the said opening 10 into the said battery holders 12, wherein a first insertion contact seat 13 is situated at one end of the said battery holders 12 proximal to the position of the said opening 10 and a second insertion contact seat 14 is situated at the position of the other opening 16 proximal to the opposite end, with a slot 15 formed in the top of the said second insertion contact seat 14. A minimum of one or more first electrical contacts 2 that are fitted into the said first insertion contact seat 13; and a minimum of one or more second electrical contacts 3 that are fitted into the said second insertion seat 14 through the said slot 15.

In the most preferred embodiment of the invention herein, there are two said battery holders 12 placed in parallel inside the said compartment 11, such that a plurality of batteries are sequentially installed from the said opening 10 into the inside of each said battery holder 12. The said first insertion contact seat 13 is respectively situated at one end of the said battery holders 12 proximal to the position of the said opening 10. The said second insertion contact seat 14 is respectively situated at the position of the other openings 16 proximal to the opposite end. The slot 15 is formed on the top edge of the other opening 16 proxsimal to one of the said second insertion contact seats 14. Therefore, two first electrical contacts 2 are able to be each separately and, furthermore, alternately fitted into one first insertion contact seat 13 and second insertion contact seat 14 of the said battery holders 12. Two second electrical contacts 3 aligned with the opposite end of the said first electrical contacts 2 are respectively fitted into another first insertion contact seat 13 and second insertion contact seats 14 through the said slot 15. In other preferred embodiments of the invention, a plurality of said battery holders 12 (more than two) may be designed and placed in parallel inside the said compartment 11 for receiving more batteries. At this moment, a plurality of said slot 15 (more than two) may be formed on the edges of the other openings 16 proximal to the said second insertion contact seats 14 spaced with each other, while the adjacent second insertion contact seats 14 without having said slot 15 on the edge of the corresponding other openings 16, for fitting the said second electrical contacts 3 therethrough.

Based on the said design, the spatial displacement and arrangement of the said case 1 accommodates the dimensions of the circuit board installed inside the electronic device, with no limitations and consequent size modifications imposed by the position of the said compartment 11.

Figure 4:
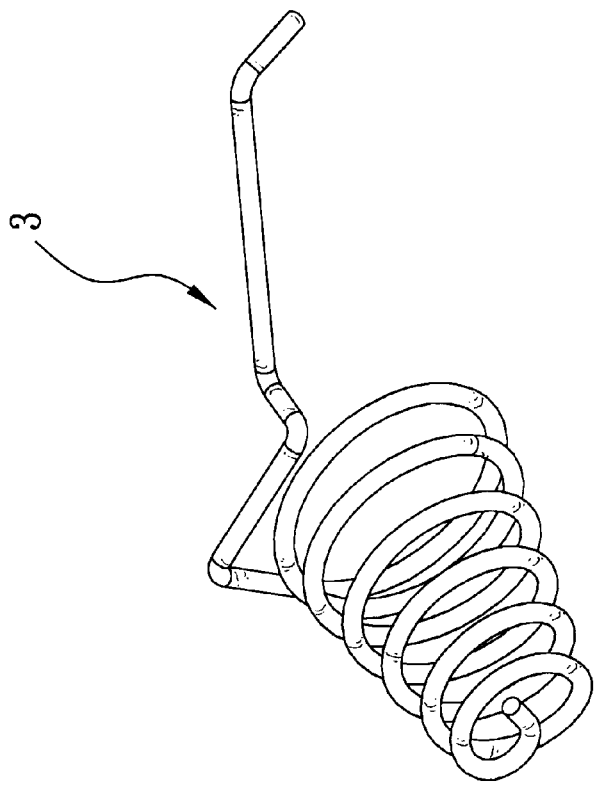
FIG. 4 is a perspective drawing of the second electrical contact of the invention herein.
Figure 5:
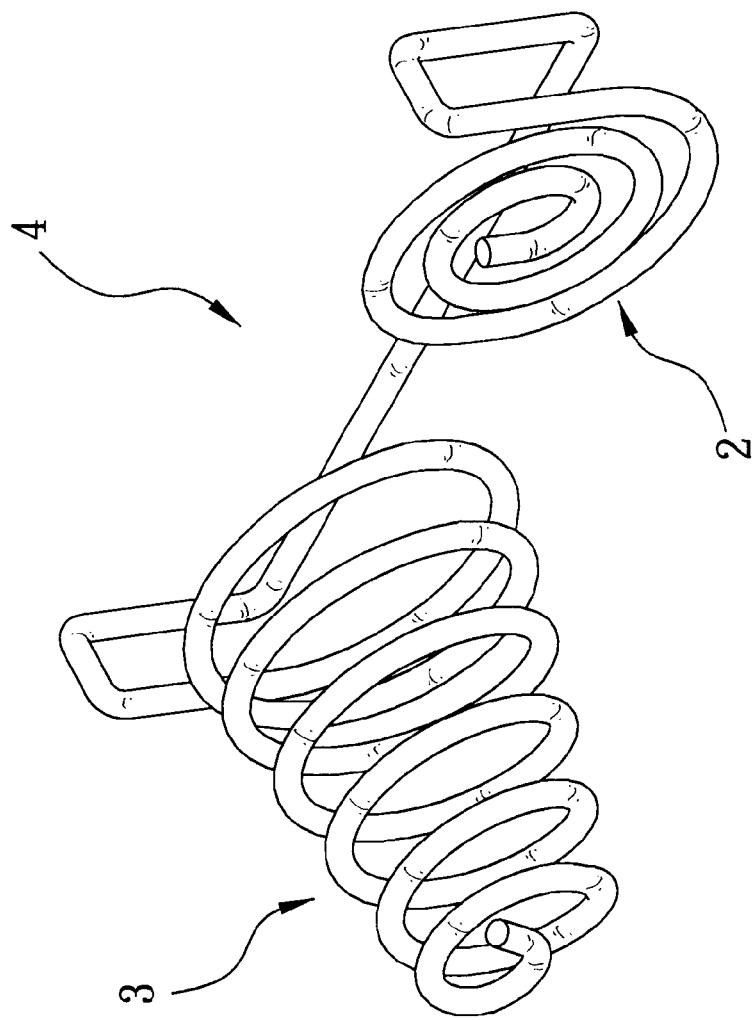
FIG. 5 is a perspective drawing of the third electrical contact of the invention herein.

In the invention herein, again referring to FIG. 1, FIG. 2, FIG. 3 and FIG. 4, each said first insertion contact seat 13 has a mounting hole 130, with the said mounting holes 130 facing the said opening 10 such that the said first electrical contacts 2 and the said second electrical contacts 3 are installed into the said first insertion contact seats 13 by inserting them into the said mounting holes 130 from the said opening 10, wherein the said first electrical contacts 2 and the said second electrical contacts 3, referring to FIG. 5, can be of a one-piece fabricated design, with the shape of a third electrical contact 4 capable of establishing a bridge circuit between the positive and negative polarities of two batteries.

In the invention herein, referring to FIG. 1, FIG. 2, FIG. 3, and FIG. 4, another mounting hole 140 is disposed in each said second insertion contact seat 14 positioned towards the back surface of the said case 1 and the said other mounting holes 140 are exposed proximal to the said opening 10 at one end of the said battery holders 12; as such, the said first electrical contacts 2 and the said second electrical contacts 3 that must be installed on the said second insertion contact seats 14 are inserted into the said other mounting holes 140 from the bottom section of the said compartment 11.

Figure 3:
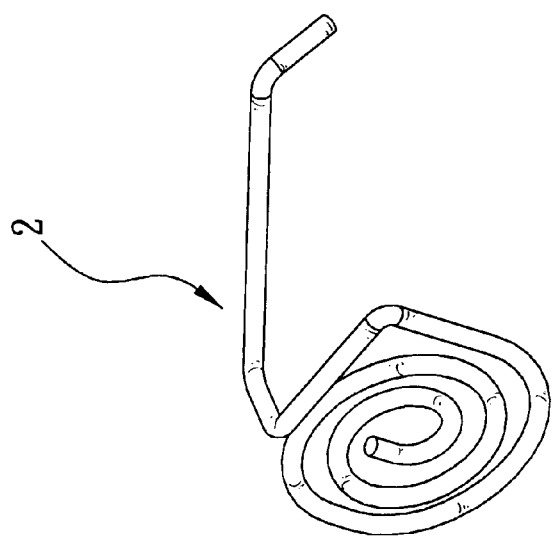
FIG. 3 is a perspective drawing of the first electrical contact of the invention herein.

In the said embodiments, each said first electrical contact 2 is a metal conductor that is coil-wound, referring to FIG. 3, and formed into a flat spiral spring.

In the said embodiments, each said second electrical contact 3 is a metal conductor that is coil-wound, referring to FIG. 4, and formed into a helical spring.

In the said embodiments, the said flat spiral spring and the said helical spring can be designed as a one-piece component, referring to FIG. 5, and formed into the said third electrical contact 4.

Figure 2:
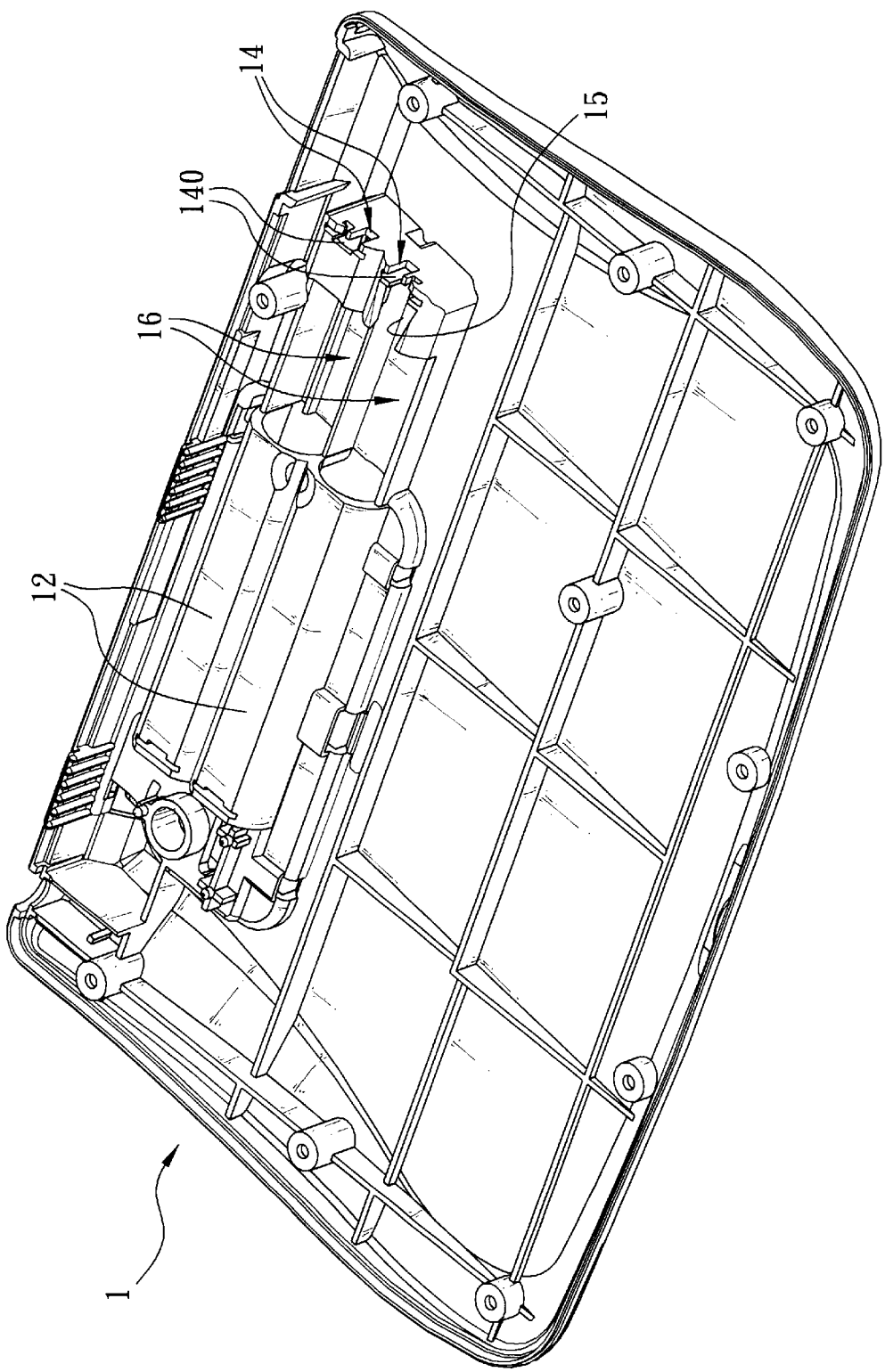
FIG. 2 is a perspective drawing of the structure of the invention herein (2).

In the invention herein, referring to FIG. 1 and FIG. 2, each said slot 15 and each said second insertion contact seat 14 are interconnected and their external profile is stepshaped to facilitate the installation of each said helical spring.

In the invention herein, referring to FIG. 1 and FIG. 2, the surface area of the said 1opening 10 is smaller than the surface area at the bottom of the said compartment 11 such that when the said dry-cell batteries are installed in a flush series within the said battery holders 12, the thrust produced by the elasticity of the said helical springs and applied against two in-series batteries keeps them under compression so that they are not pushed out from the said battery holders 12, thereby preventing inconveniences during drycell battery installation.

In the invention herein, referring to FIG. 1 and FIG. 2, the length and capacity of the said battery holders 12 can be modified according the requirements of the said electronic device to facilitate an in-series flush arrangement of the said dry-cell batteries that supply the electricity needed by the said electronic device; for example, if the said electronic device requires 9.0 volts of potential, then two rows of the said battery holders 12 are installed, with each said battery holder 12 containing three dry-cell batteries arranged in series, three per row in the said battery holders 12 such that the said battery holders 12 are packed with two rows of batteries.

In the invention herein, referring to FIG. 1, the said opening 10 can be equipped with a matching cover that completely closes the said opening 10, wherein the said opening has latch component and the said cover has a locking component, thereby enabling the easy securing of the said cover onto the said opening 10.

While the invention has been described by means of specific embodiments, numerous modifications and variations could be made thereto by those skilled in the art without departing from the scope and spirit of the invention set forth in the claims.

What is claimed is:

1. An electronic device battery holder structure including:
   a case of one-piece construction, which is comprised of an opening formed in the exterior lateral surface of the said case, at least one another opening in the interior lateral surface of the said case, at least one compartment disposed in the said case such that one portion of each said compartment is aligned with and contiguous to the position of the said opening and its other portion is aligned with and contiguous to the position of each said other opening, and at least one battery holder internally situated in the said compartment enabling the sequential installation of a plurality of batteries from the said opening into the said battery holders, wherein a first insertion contact seat is situated at one end of the said battery holders proximal to the position of the said opening and a second insertion contact seat is situated at the position of the said other opening proximal to the opposite end, with a slot formed in the top of the said second insertion contact seat adjacent to said other opening;

at least one first electrical contact, which is fitted into the said first insertion contact seat;

at least one second electrical contact, which is fitted into the said second insertion seat through said slot.

2. An electronic device battery holder structure as claimed in claim 1 in which, when there are a plurality of said battery holders in the said compartment, said battery holders are placed in parallel inside the said compartment such that a plurality of batteries are sequentially installed from the said opening into the inside of each said battery holder;

the said first insertion contact seat is respectively situated at one end of the said battery holders proximal to the position of the said opening and the said second insertion contact seat is respectively situated at the position of the said other opening proximal to the opposite end as well as the said slot formed in the top of the said second insertion contact seat, while the adjacent second insertion contact seat or seats without having said slot 15 on the top;

the said first electrical contact is separately and alternately fitted into the said first insertion contact seat and the said second insertion contact seat of the said battery holders;

the said first electrical contact aligned with the opposite end of the said first electrical contact is fitted into the said second insertion contact seat through said slot and the said first insertion contact seat in the said battery holders.

3. An electronic device battery holder structure as claimed in claim 2 in which each said first insertion contact seat has a mounting hole, with the said mounting hole facing the said opening such that the said first electrical contact and the said second electrical contact are installed into the said first insertion contact seats by inserting them into the said mounting holes from the said opening and thereby install them onto the said first insertion contact seat.

4. An electronic device battery holder structure as claimed in claim 2 in which another mounting hole is disposed in each said second insertion contact seat positioned towards the back surface of the said case and the said other mounting holes are exposed proximal to the said other opening at one end, enabling the said first electrical contacts and the said second electrical contacts to be inserted into the said other mounting holes from the bottom section of the said compartment and thereby install them onto the said second insertion contact seat.

5. An electronic device battery holder structure as claimed in claim 2 in which the said first electrical contact is a metal conductor that is coil-wound and formed into a helical spring.

6. An electronic device battery holder structure as claimed in claim 2 in which said second electrical contact is a metal conductor that is coil-wound and formed into a flat spiral spring.

7. An electronic device battery holder structure as claimed in claim 3 in which the said first electrical contact and the said second electrical contact can be designed as a one-piece component to form a third electrical contact.

8. An electronic device battery holder structure as claimed in claim 6 in which the surface area of the said opening is smaller than the surface area at the bottom of the said compartment such that when the said dry-cell batteries are installed in a flush series within the said battery holders, the thrust produced by the elasticity of the said helical springs and applied against two in-series batteries keeps them under compression so that they are not pushed out from the said battery holders, thereby preventing inconveniences during dry-cell battery installation.

9. An electronic device battery holder structure as claimed in claim 2 in which the said opening can be equipped with a matching cover that completely closes the said opening.

10. An electronic device battery holder structure as claimed in claim 9 in which said cover has a locking component and the said opening has a matching latch component, enabling the said cover to be secured onto the said opening.

11. An electronic device battery holder structure as claimed in claim 6 in which the external profile of each said slot is step-shaped to facilitate the installation of each said helical spring.

* * * * *